(12) United States Patent
Prouzet

(10) Patent No.: US 12,000,444 B2
(45) Date of Patent: Jun. 4, 2024

(54) BRAKE DISK AND BRAKE WITH INTEGRAL THERMAL FUSE

(71) Applicant: Ratier-Figeac SAS, Figeac (FR)

(72) Inventor: Bertrand Prouzet, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 86 days.

(21) Appl. No.: 17/706,812

(22) Filed: Mar. 29, 2022

(65) Prior Publication Data

US 2022/0325761 A1 Oct. 13, 2022

(30) Foreign Application Priority Data

Apr. 12, 2021 (EP) ..................................... 21290020

(51) Int. Cl.
| | | |
|---|---|---|
| *F16D 65/853* | (2006.01) | |
| *B64C 27/12* | (2006.01) | |
| *F16D 65/00* | (2006.01) | |
| *F16D 65/12* | (2006.01) | |
| *F16D 65/02* | (2006.01) | |

(52) U.S. Cl.
CPC ............ *F16D 65/123* (2013.01); *B64C 27/12* (2013.01); *F16D 65/005* (2013.01); *F16D 2065/1392* (2013.01); *F16D 2200/00* (2013.01)

(58) Field of Classification Search
CPC ......... F16D 65/005; F16D 65/123–128; F16D 2065/1392; F16D 2200/00; B64C 27/12
USPC ............. 188/18 A, 218 XL, 264 A, 264 AA; 192/109 R
See application file for complete search history.

(56) References Cited

U.S. PATENT DOCUMENTS 2,224,440 A * 12/1940 Lewis ....................... F16D 9/02
 192/56.6
2,655,015 A * 10/1953 Linder .................. F16D 43/216
 192/82 T
2,825,437 A * 3/1958 Reykjalin ................. F16D 9/02
 192/113.34

(Continued)

FOREIGN PATENT DOCUMENTS

| FR | 2985294 A1 | 7/2013 |
| GB | 798952 A | 7/1958 |

OTHER PUBLICATIONS

Extended European Search Report for International Application No. 21290020.3 dated Sep. 21, 2021, 9 pages.
FR2985294A1 Abstract, 2 pages.

*Primary Examiner* — Christopher P Schwartz
(74) *Attorney, Agent, or Firm* — CANTOR COLBURN LLP

(57) ABSTRACT

A brake disk defines an annular shape having a radially inner side and a radially outer side. The brake disk includes: a radially outer braking surface, the braking surface having a maximum operating temperature; a fusible material section radially inward from and connected to the braking surface. The fusible material has a maximum operating temperature, the fusible material section suitable for transmitting torque between the braking surface and a shaft. The maximum operating temperature of the braking surface is higher than the maximum operating temperature of the fusible material section. When the temperature of the fusible material section raises above the maximum operating temperature of the fusible material section, the fusible material section is configured to no longer transmit torque between the braking surface and the shaft.

14 Claims, 9 Drawing Sheets

(56) References Cited

U.S. PATENT DOCUMENTS

| | | | | |
|---|---|---|---|---|
| 2,907,426 | A | * | 10/1959 | Jacobs .................... F16D 27/08 417/420 |
| 3,675,444 | A | * | 7/1972 | Whipple ................... F16D 9/02 192/82 T |
| 4,241,818 | A | * | 12/1980 | Miller .................... F16D 27/112 192/109 R |
| 4,763,762 | A | * | 8/1988 | Schneider ............. F16D 65/122 188/218 XL |
| 5,062,503 | A | | 11/1991 | Black et al. |
| 5,443,372 | A | * | 8/1995 | Kanoll ...................... F16D 9/06 417/319 |
| 5,613,578 | A | * | 3/1997 | Moseley ............... F16D 69/023 188/218 XL |
| 5,800,137 | A | * | 9/1998 | Eitai ................... F04B 27/0895 403/2 |
| 5,862,892 | A | | 1/1999 | Conley |
| 7,156,743 | B2 | * | 1/2007 | Tsutsui ............... C22C 33/0228 428/681 |
| 8,210,232 | B2 | * | 7/2012 | Xia ....................... B22D 19/02 164/112 |
| 8,517,698 | B2 | * | 8/2013 | Cochran ................... F16D 9/06 192/84.961 |
| 2020/0149603 | A1 | | 5/2020 | Prouzet |
| 2023/0082894 | A1 | * | 3/2023 | Sardi ...................... B64C 27/12 188/72.1 |

* cited by examiner

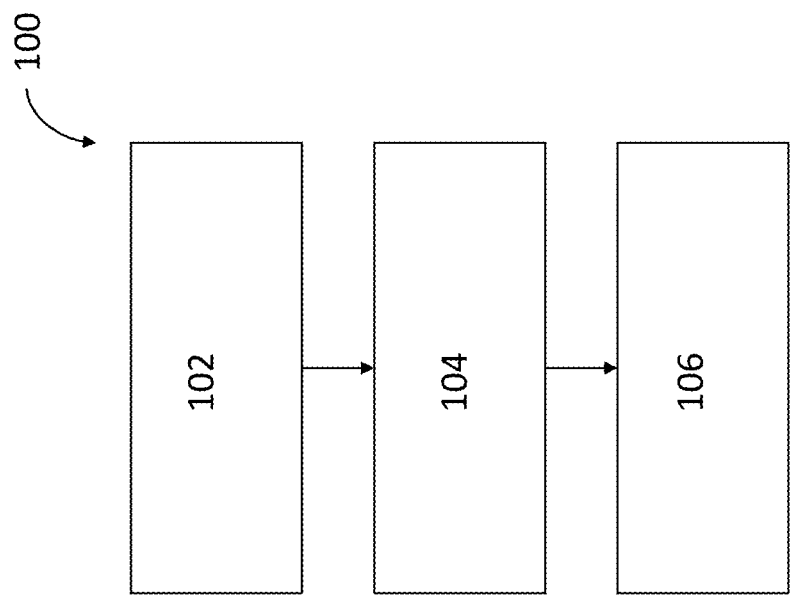

BRAKE DISK AND BRAKE WITH INTEGRAL THERMAL FUSE

CROSS-REFERENCE TO RELATED APPLICATIONS

This application claims priority to European Patent Application No. 21290020.3 filed Apr. 12, 2021, the entire contents of which is incorporated herein by reference.

TECHNICAL FIELD

The present disclosure relates to a brake disk and a brake for an aircraft, and a method of making a brake disk.

It is common to use brakes in an aircraft to brake rotating components. For example, a helicopter may be provided with a brake to rapidly slow the rotor rotation after the engine has been switched off, after landing. The brake may also be used to stop the rotor from rotating under e.g. gusts of wind, while the helicopter is grounded. Similarly, a brake may be provided on an aircraft propulsion system, such as turbopropellor (turboprop), turbofan, prop fan, open rotor etc. to rapidly slow rotation after the engine has been switched off, after landing. The brake may also be used to stop the rotor from rotating under e.g. gusts of wind, while the aircraft is grounded.

BACKGROUND

It is possible that the brake may be accidentally applied while the engine or propeller is still running, for example, due to a system failure. This can lead to an abnormally high amount of energy being generated by the brake which can cause excessive heating of the brake, potentially causing a fire or thermally damaging aircraft or engine components.

Such conventional brakes have generally been considered satisfactory for their intended purpose but it is desirable to mitigate the risk of overheating of a brake.

SUMMARY

According to a first aspect, there is provided a brake disk, the brake disk defining an annular shape having a radially inner side and a radially outer side; the brake disk comprising: a radially outer braking surface, the braking surface having a maximum operating temperature; a fusible material section radially inward from and connected to the braking surface, the fusible material having a maximum operating temperature, the fusible material section for transmitting torque between the braking surface and a shaft while a temperature of the fusible material section is below the maximum operating temperature of the fusible material section; wherein the maximum operating temperature of the braking surface is higher than the maximum operating temperature of the fusible material section; and wherein when the temperature of the fusible material section raises above the maximum operating temperature of the fusible material section, the fusible material section is configured to no longer transmit torque between the braking surface and the shaft.

The fusible material section may allow the braking surface to disconnect from the shaft when the temperature raises above the maximum operating temperature of the fusible material section. Before the temperature raises above the maximum operating temperature of the fusible material section, the fusible material section provides a torque transmission path between the shaft and the braking surface, and has sufficient strength to transmit braking torque. Thus, the fusible material section provides a "thermal fuse" that will disconnect when the temperature rises too high. Other components, e.g. a mounting portion, may sit between the fusible material section and the shaft.

The fusible material section may comprise a spline extending circumferentially around a radially outer side of the fusible material section. Alternatively or additionally, the fusible material section may comprise a spline extending circumferentially around a radially inner side of the fusible material section.

The spline may help secure the fusible material section axially within the brake disk.

The fusible material section may have a non-circular profile at a radially outer surface. Alternatively or additionally, the fusible material section may have a non-circular profile at a radially inner surface.

The or each non-circular profile may comprises one of: a toothed outer-profile, a splined outer profile, and a zig-zag outer profile.

The non-circular outer profile may improve torque transmission between the shaft and the braking surface. The splines, teeth, and/or zig-zag profile may be the primary means of torque transmission. Welding between the fusible material section and the braking surface may provide an additional means of torque transmission.

The fusible material section may be made from a eutectic material.

A eutectic material may provide a clearly defined melting point for the fusible material section, and thereby define a clear maximum operating temperature of the fusible material section.

The brake disk may comprise an annular mounting portion, wherein one or more teeth are formed in the mounting portion. The mounting portion may connect between the fusible material and the shaft. The teeth of the mounting portion may interface with corresponding teeth or splines on the shaft.

The mounting portion may comprise a first portion and a second portion, wherein the fusible material section is formed between the first and second portions of the mounting portion, such that the fusible material section is connected to the braking surface via the second portion of the mounting portion.

The mounting portion may have a first axial thickness, and the fusible material may have a second axial thickness, and the braking surface may have a third axial thickness, wherein the third axial thickness is less than the first and second axial thicknesses.

One or more teeth may be formed at a radially innermost surface of the fusible material section. This may allow the fusible material section to directly connect to the shaft, i.e. with no intervening mounting portion.

The maximum operating temperature of the fusible material section may be within the range of 200° C. to 1000° C. Optionally, the maximum operating temperature of the fusible material section may be within the range of 450° C. to 700° C., or in the range 625° C. to 675° C. In one example, the maximum operating temperature of the fusible material is 645° C. The fusible material section may be configured to melt, to thermally decompose, or to substantially weaken when above its maximum operating temperature, so as to no longer transmit torque to the braking surface. In some embodiments, the maximum operating temperature of the fusible material section is a melting temperature of a material that the fusible material section is made from.

This may limit the overall temperature rise during a braking operation.

According to a second aspect, there is provided a brake for an aircraft comprising: a housing; a shaft defining an axis and extending into the housing and having teeth or splines; a first brake pad and a second brake pad; and the brake disk of the first aspect arranged on or formed integrally with the shaft and located axially between the first and second brake pads. The one or more teeth of the brake disk engage the teeth or splines of the shaft and the brake is configured to move at least one of the brake pads to press against the braking surface of the brake disk to resist rotation of the brake disk via friction and thereby resist rotation of the shaft.

In the event of excessive heat dissipation within the brake, e.g. due to the shaft still being driven when the brake is applied, the fusible material section may rise above the maximum operating temperature, and then melt, thermally decompose, or substantially weaken such that the braking surface disconnects from the shaft. The brake pads may then quickly bring the (disconnected) braking surface to a halt and this may thereby limit an overall temperature rise of the brake.

The fusible material section may have a minimum thickness in the radial direction, and a gap having a length may be defined between a radially outermost surface of the braking disk and an inner surface of the housing, wherein the minimum thickness is larger than the gap length.

The brake may further comprise one or more bearings mounted to the shaft and to the housing for supporting the shaft for rotation within the housing, and/or may further comprise an actuator for moving one of the first or second brake pads axially within the housing along the direction of the shaft axis.

According to another aspect, there is provided a method of making a brake disk, the method comprising: pouring a molten fusible material into an annular gap between two components, wherein the two components are either 1) first and second mounting portions of the brake disk, or 2) a mounting portion and a braking surface of the brake disk; or 3) a braking surface of the brake disk and a sacrificial component; or 4) a braking surface of the disk and a shaft. The method further comprises solidifying the fusible material to form a fusible material section between the first and second components.

The method may be used to make a brake disk according to the first aspect.

The method may further comprise machining an annular groove into one or both of the components, such that when the molten fusible material is poured into the annular gap, the molten fusible material fills the groove(s). The fusible material in the groove may assist an axial force transfer within the brake disk. That is, the engagement of the fusible material with the groove may connect the fusible material section more strongly to the adjacent component and thus impart greater strength to the brake disk in the axial direction.

BRIEF DESCRIPTION OF THE DRAWINGS

Certain embodiments of the present disclosure will now be described in greater detail by way of example only and with reference to the accompanying drawings in which:

FIG. 8 shows a method of forming a brake disk; and

DETAILED DESCRIPTION

Figure 1:
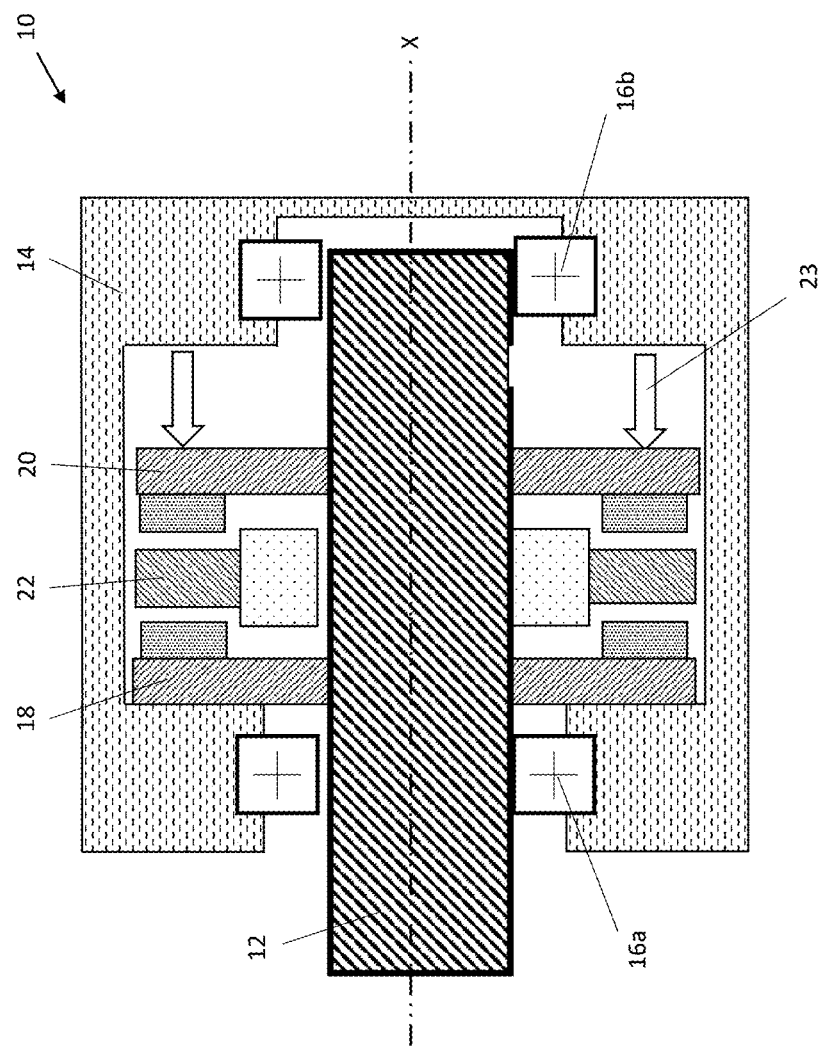
FIG. 1 shows a cross section of a prior art brake for an aircraft.

FIG. 1 shows a known design of brake 10 for an aircraft. A rotary shaft 12 extends into a housing 14 of the brake 12. The shaft 12 interfaces with the aircraft such that rotation of a component of the aircraft (e.g. a rotor, propeller etc. —not shown) also drives the shaft 12 for rotation. The shaft 12 has a shaft axis X.

Figure 2:
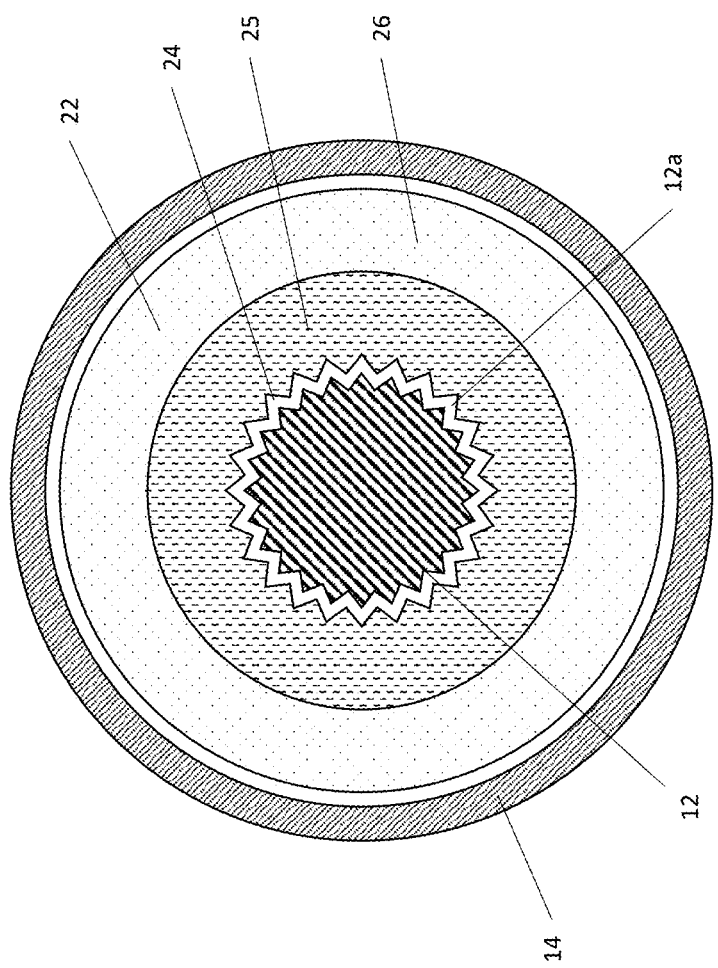
FIG. 2 shows a plan view of a brake disk of the brake of FIG. 1.

The shaft 12 is supported on a pair of bearings 16a,b that are mounted in the housing 14. A first brake pad 18 is located within the housing 14 and is held against rotation with respect to the housing 14. A second brake pad 20 is located within the housing 14 and is held against rotation with respect to the housing 14. The first and second brake pads 18,20 are ring-shaped and extend circumferentially around the shaft 12 (i.e. around the shaft axis X) and are generally coaxial with the shaft axis X and are radially spaced from the shaft 12. In other examples (not shown), the brake pads 18,20 do not extend around the full circumference of the shaft 12. As shown in FIG. 2, the shaft has teeth or splines 12a along at least a portion of its outer surface within the housing 14.

At least one of the brake pads 18,20 is configured to move axially within the housing 14, along the direction of the shaft axis X. In the example shown in FIG. 1, the second brake pad 20 is arranged to move axially along axis X within the housing 14, and the first brake pad 18 is axially fixed within the housing 14. In other embodiments (not shown) the first brake pad 18 may additionally or alternatively be axially movable along the axis X within the housing 14.

The first and second brake pads 18,20 are arranged either side of a brake disk 22. A brake disk 22 is provided on the shaft 12. As shown in FIG. 2, the brake disk 22 has teeth 24 which engage with the teeth or splines 12a on the shaft 12, such that the brake disk 22 may move axially along the shaft 12 and such that rotation of the shaft 12 is transmitted to the brake disk 22 and, correspondingly, braking of the brake disk 22 will brake the shaft 12. The brake disk 22 is arranged axially between the first and second brake pads 18,20. In other examples (not shown) where the first brake pad 18 may additionally or alternatively be axially movable along the axis X within the housing 14, the disk 22 can be axially fixed on shaft 12, i.e. such that the disk 22 does not slide along the shaft 12 under pressure from one of the brake pads 18,20.

During operation of the aircraft, rotation of a component (e.g. rotor, propeller etc.) is mechanically transmitted to the shaft 12 such that, while the component is rotating, the shaft 12 is rotating as well. The component may be connected to the shaft 12 via a gearbox (not shown). To brake the shaft 12, and thereby brake rotation of the component, the second brake pad 20 is pressed against the brake disk 22. Under this pressure, the brake disk 22 slides along the shaft 12 until it contacts the first brake pad 18. The brake disk 22 is then squeezed between the first and second brake pads 18,20 and, via friction, rotation of the brake disk 22 (and therefore rotation of both the shaft 12 and the component) is slowed. Rotation of the brake disk 22 while it is being squeezed by the brake pads 18,20 generates heat within the brake 10 via friction with the brake pads 18,20. This converts the kinetic energy of the brake disk 52 and shaft 12 into thermal energy in the brake 10.

The second brake pad 20 may be moved by any conventional means, including a hydraulic actuator, a mechanical actuator, or an electrical actuator and the movement means are schematically depicted by arrow 23 in FIG. 1. As one example of a suitable mechanical actuator, in some small helicopters there is a lever in the cockpit that pulls on a cable to apply one or both of the brake pads 18,20 to the disk 22.

In embodiments where the first brake pad 18 may alternatively or additionally move axially within the housing, then the first brake pad 18 too may be moved by any conventional means, including a hydraulic actuator, mechanical actuator, or an electrical actuator. In this example brake 10, the principle of braking operation is thereafter the same as before, i.e. the brake disk 22 is squeezed between the two brake pads 18,20 and this inhibits/slows rotation of the shaft 12.

The known design of brake disk 22 is shown in plan view in FIG. 2. This brake disk 22 is shown in situ, mounted on the shaft 12 and located within the housing 14. The inter-engagement of the teeth 24 of the brake disk 22 with the teeth or splines 12a of the shaft 12 ensure that the brake disk 22 and shaft 12 are connected together for rotation. The brake disk 22 remains connected to the shaft 12 via the teeth or splines at all points along the brake disk's 22 range of axial motion during the braking operation. That is, when the brake disk 22 slides along the shaft 12 under pressure from the second brake pad 20, the brake disk 22 remains connected for rotation with the shaft 12.

The braking disk 22 has a braking surface 26 formed in a ring shape, where the ring shape is concentric with the shaft axis X. During braking, the brake pads 18,20 press against the braking surface 26 of the braking disk 22 on both sides of the braking disk 22.

Radially inward from, and connected to, the braking surface 26, the brake disk 22 comprises a mounting portion 25. The teeth 24 of the braking disk are formed at a radially inner extent of the mounting portion 25, facing in towards the shaft 12.

In FIG. 2, the backlash (i.e. gap) between the teeth 24 and the teeth or splines 12a of the shaft 12 is shown exaggerated, for clarity. In practical applications, the backlash will be small, so as to limit shock loading of the teeth 24 against the teeth or splines 12a when the brake 10 is activated.

The braking surface 26 may be formed of any suitable material. Examples of suitable materials, include carbon/carbon, carbon/ceramic, and steel. Other suitable materials for the braking surface are known in the art.

The braking surface 26 may be formed from the same material as the mounting portion 25 or from a different material. The mounting portion 25 may have a different axial thickness (measured along the shaft axis X, when mounted on the shaft 12) than the braking surface 26. For example, as shown in FIG. 1, the mounting portion 25 is thicker than the braking surface 26. Alternatively, the mounting portion 25 may have the same axial thickness as the braking portion 26 or may be thinner than the braking portion 26.

Figure 3:
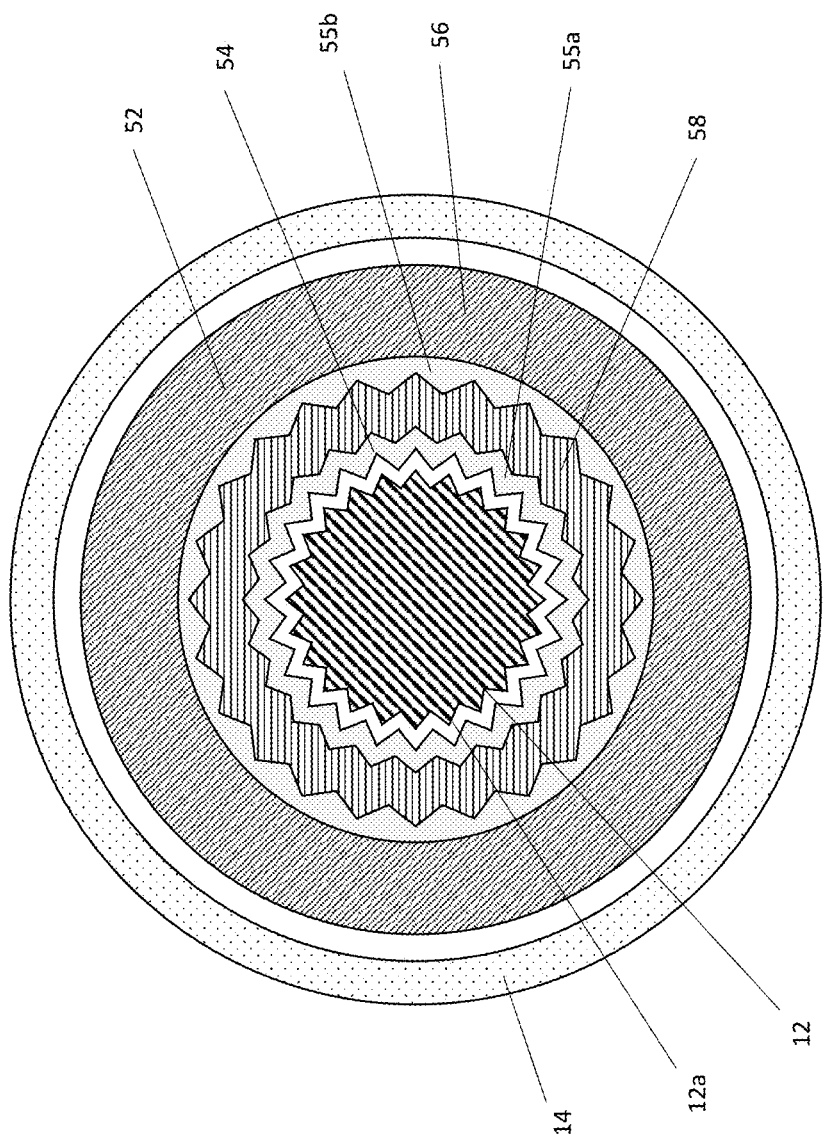
FIG. 3 shows a plan view of a brake disk according to the present disclosure.

FIG. 3 shows a cross-section of a brake disk 52 according to the present disclosure. This brake disk 52 is usable within the brake 10 described hereinabove and so like reference numerals will be used to describe like components. The method of operation of a brake 10 incorporating the present brake disk 52 is also mostly similar and so the following description will focus primarily on the differences.

FIG. 3 shows the brake disk 52 mounted on the shaft 12 and within the housing 14. The brake disk 52 has teeth or splines 54 that engage corresponding teeth or splines 12a of the shaft 12. The inter-engagement of the teeth (or splines) 54 of the brake disk 52 with the teeth or splines 12a of the shaft 12 ensure that the brake disk 52 and shaft 12 are connected together for rotation.

The brake disk 52 has a braking surface 56 formed in a ring shape, mounted circumferentially around the shaft 12 and concentric with the shaft axis X. As before, during braking, the brake pads 18,20 press against the braking surface 56 of the braking disk 52 to brake rotation of the brake disk 52 and thereby brake rotation of the shaft 12.

Between the teeth 54 of the brake disk 52 and the braking surface 56, there is a fusible material section 58. The fusible material section 58 extends circumferentially around the shaft axis X, such that the braking surface 56 is connected to the teeth 54 via the fusible material section 58.

The material for the fusible material section 58 is selected such that it will melt, thermally decompose, or substantially weaken when its temperature rises above a given threshold temperature. The given threshold temperature may be considered a maximum operating temperature of the fusible material section 58. The material may, for example, be a eutectic material having a well-defined melting point and, in this example, the melting point is the maximum operating temperature.

The maximum operating temperature of the fusible material section may be greater than 200° C. and equal to or less than 1000° C. In other examples, the maximum operating temperature may be in the range of 450° C. to 700° C., or in the range 625° C. to 675° C. In one example, the maximum operating temperature may be 645° C. (i.e. this may be the melting temperature of the material of the fusible material section). If the temperature within the brake disk 52 rises above the threshold (e.g. the melting point of the eutectic material), as a result of heat of friction between the brake pads 18,20 and the braking surface 56, then the fusible material section 58 will melt (or thermally decompose etc.). This causes the braking surface 56 to mechanically disconnect from the teeth 54 and therefore disconnect from the shaft 12.

The braking surface 56 also has a maximum operating temperature (i.e. a temperature at which the material of the braking surface will melt or thermally decompose) and this is higher than the maximum operating temperature of the fusible material section 58. Typically, the maximum operating temperature of the braking surface will be 1450° C.

As a result of the melting of the fusible material section 58, the brake 10 will no longer brake rotation of the shaft 12.

In situations where the shaft 12 is still being actively driven e.g. by an engine of the aircraft, the application of braking force in a brake 10 using the prior art brake disk 22 could cause the temperature of the brake 10 to rise very high, very rapidly. This is a known fire risk and could also cause thermal damage to other parts near the brake 10. Contamination of the braking surface or brake pads can also lead to excessive heating within the brake 10. Contamination of the braking surface or the brake pads 18 and/or 20 can lead to a reduction of the friction coefficient between pads 18 & 20 and brake disc 22. This reduction of friction coefficient lead to reduction of the brake 10 performance. In this scenario, the brake 10 cannot withstand the torque applied by the shaft 12 and a slippage between the brake pads 18 20 and brake disc 22 will occur. The energy dissipated in this scenario can also lead to excessive heating within the brake 10

By contrast, in the same scenario but using a brake 10 containing the brake disk 52 according to the present disclosure, the fusible material section 58 will melt (or thermally decompose etc.) at the predetermined threshold temperature. The braking surface 56, now disconnected from the shaft 12, will be rapidly brought to a stop by friction with the brake pads 18,20 without producing much more heat (e.g. the braking surface 56 has low inertia and so, once disconnected from the shaft 12, the brake pads 18,20 only need to absorb a small amount of remaining rotational energy from the braking surface 56). In this situation, the shaft 12 will continue to spin freely. The brake 10 temperature will not rise too high. This may mitigate the risk of a fire or thermal damage as a result of excessive heating in the brake 10.

The predetermined threshold may be selected via choice of material for the fusible material section 58, and may be selected to be below e.g. a flash point of hydraulic fluid used adjacent and/or within the brake 10. As such, in the event that the brake 10 is applied while the engine is still running, the fusible material section 58 melts and the brake 10 will not become so hot as to be a fire risk. The melted fusible material may be trapped inside the housing 14 in order keep the external surface of the brake 10 below a fire ignition temperature.

That is, the material for the fusible material section 58 may be selected such that its maximum operating temperature is above the worst case of expected normal operation of the brake 10. This is so the brake 10 will continue to function under normal operations, but will avoid overheating under abnormal operations.

One commonly used aircraft fuel has a self-ignition temperature of 206° C. Therefore, keeping the outer temperature of the brake housing 14 below 206° C., in both normal and abnormal operations, may avoid the ignition of fuel contacting the brake 10, e.g. in case of a fuel leak. When the fusible material rises above its maximum operating temperature, some or all of it may contact the inside of the brake housing 14 and cause the temperature of the brake housing 14 to rise. The amount of temperature rise will be partly a function of the temperature of the fusible material contacting the housing 14 and also a function of, for example, the amount of fusible material contacting the housing 14, and the thickness and material of the housing 14 itself. As such, the maximum operating temperature of the fusible material (e.g. 450° C.) may be higher than the maximum temperature that will occurs at the outside of the brake housing 14 in the event of abnormal operation (e.g. 206° C.) by proper selection of the aforesaid parameters.

Figure 4A:
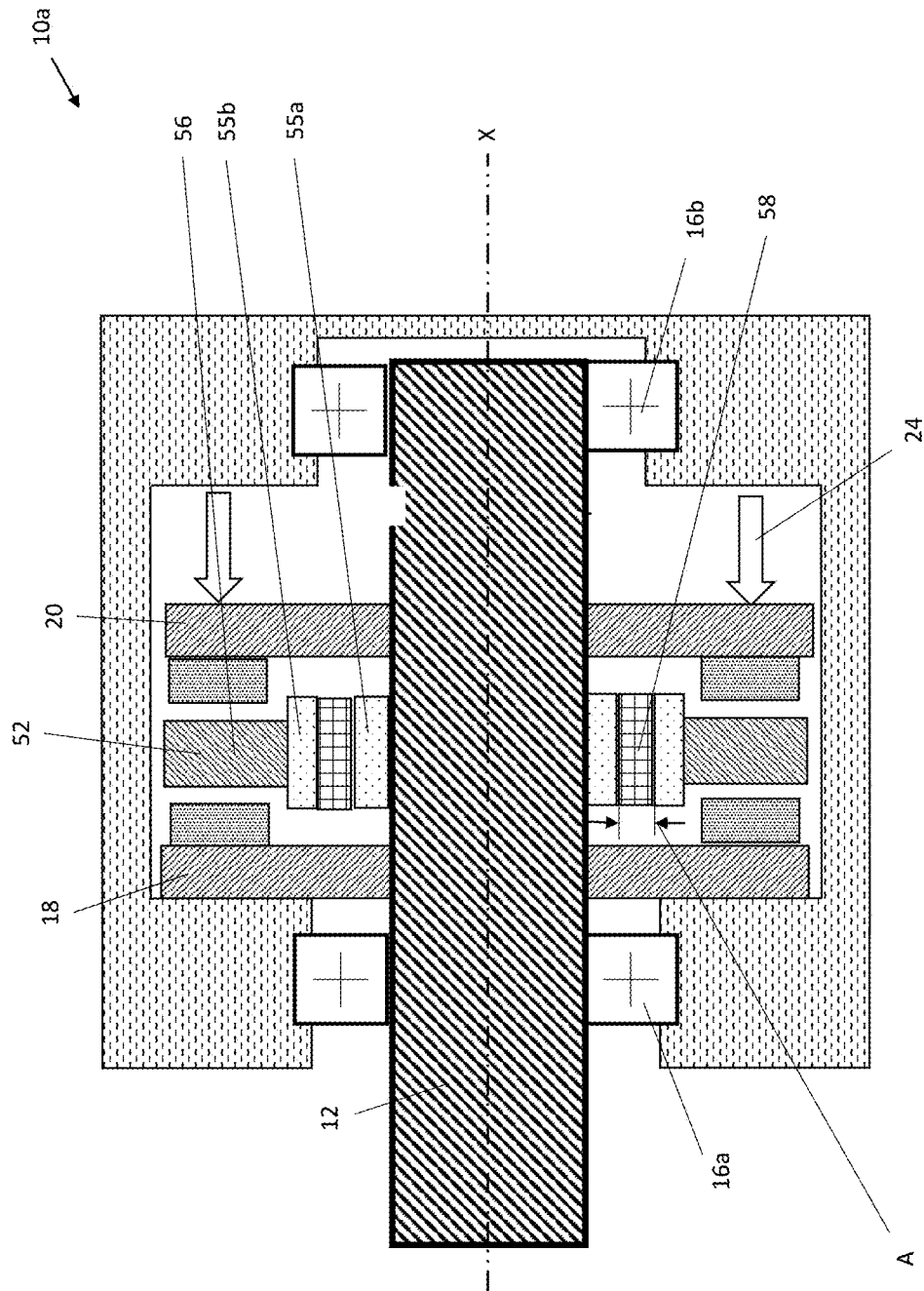
FIG. 4A shows a cross-section of a brake incorporating the brake disk of FIG. 3.

FIG. 4A shows a cross-section of a brake 10 incorporating the brake disk 52 according to the present disclosure. As shown therein, the fusible material section 58 forms the connection between the teeth 52 of the brake disk 52 and the braking surface 56.

In this example, the brake disk 52 has a generally annular mounting portion 55a,b that extends around the shaft 12. Teeth 54 are formed in the mounting portion 55a,b. The fusible material section 58 is connected at a radially inner side to a first part of the mounting portion 55a and at a radially outer side to a second part of the mounting portion 55b. The radially outer part of the mounting portion 55b then connects to the braking surface 56.

In an alternative (not shown), the teeth 54 may be formed directly in the fusible material section 58, and the fusible material may connect directly to the braking surface 56, in which case there no mounting portion would be required.

In a further alternative, the brake disk 52 may have a mounting portion 55a radially inward from and connected directly to the fusible material section 58, and the braking surface 58 may be radially outward from and connected directly to the fusible material section 55b. That is, the second portion of the mounting portion 55b may be omitted.

The disclosed arrangements keep the fusible material section 58 in close proximity and thermal contact with the region where heat is generated during braking, i.e. the braking surface 58 and brake pads 18,20. As such, the fusible material section will melt quickly when excess heat is generated in the brake 10 during abnormal operation.

Figure 4B:
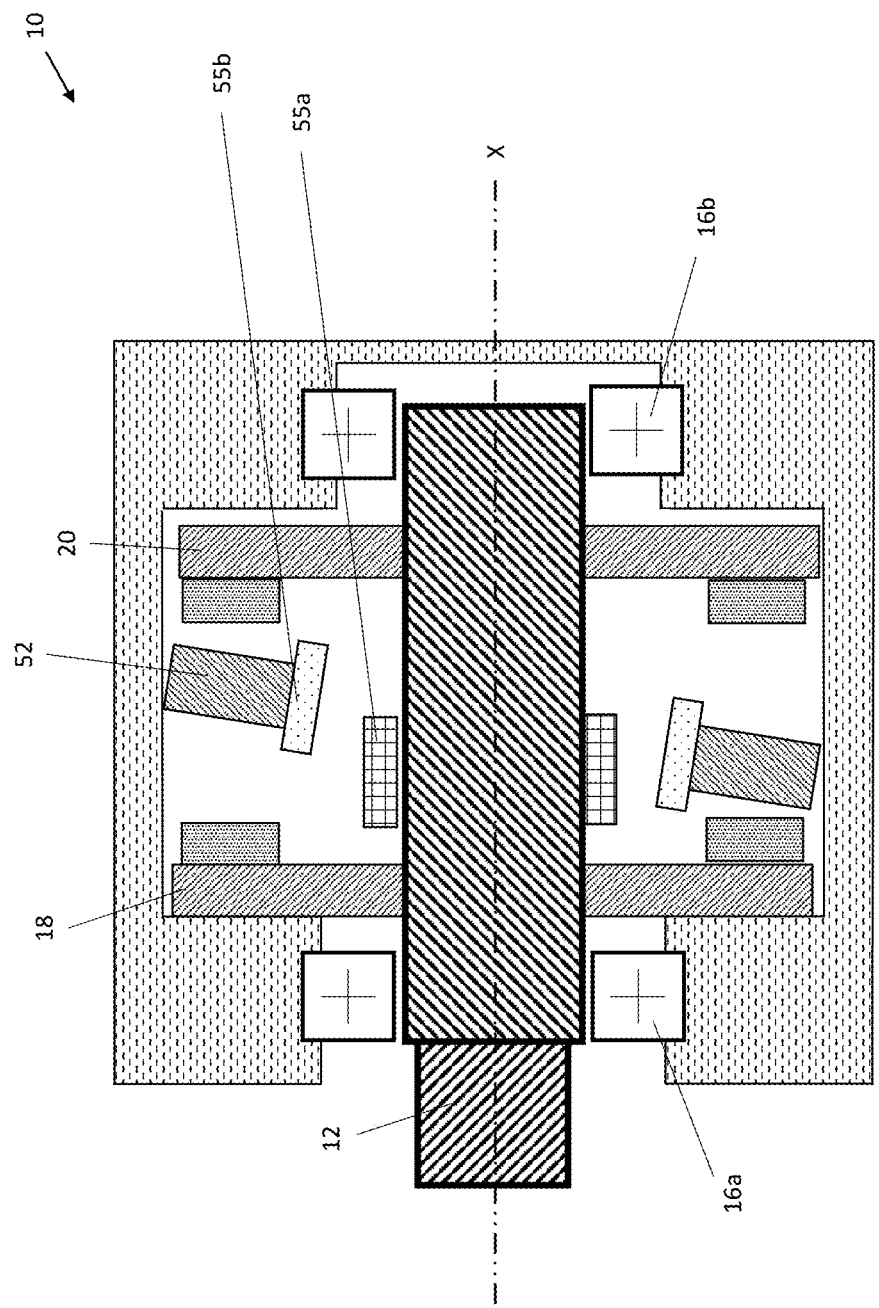
FIG. 4B shows another cross-section of a brake incorporating the brake disk of FIG. 3 after activation.

FIG. 4B shows a cross-section of the same brake 10 of FIG. 4A after the fusible material section 58 has been heated above the predetermined threshold, such that the braking surface 56 has disconnected from the teeth 54. That is, after the fusible material has melted, thermally decomposed, or otherwise broken due to weakening at high temperature. In this Figure, the brake pads 18,20 have been moved apart from the braking surface 56 and the braking surface sits loose within the housing 14, disconnected from the teeth 54 and from the shaft 12.

Figure 5B:
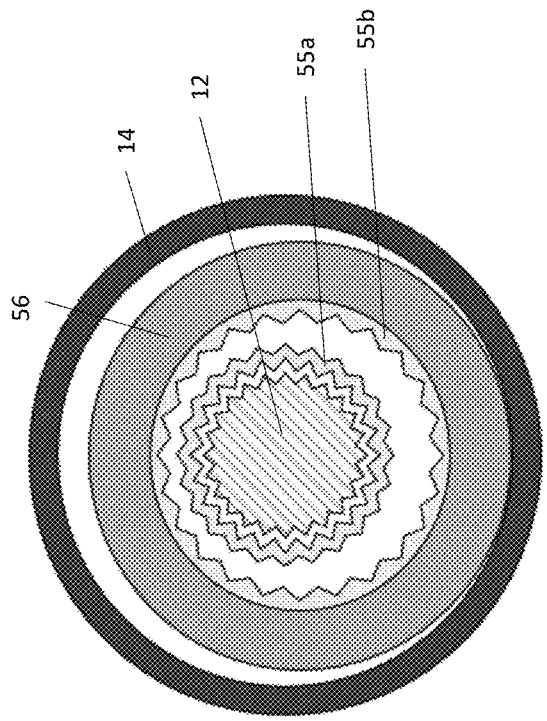
FIG. 5B shows yet another plan view of the brake and brake disk of FIG. 3.
Figure 5A:
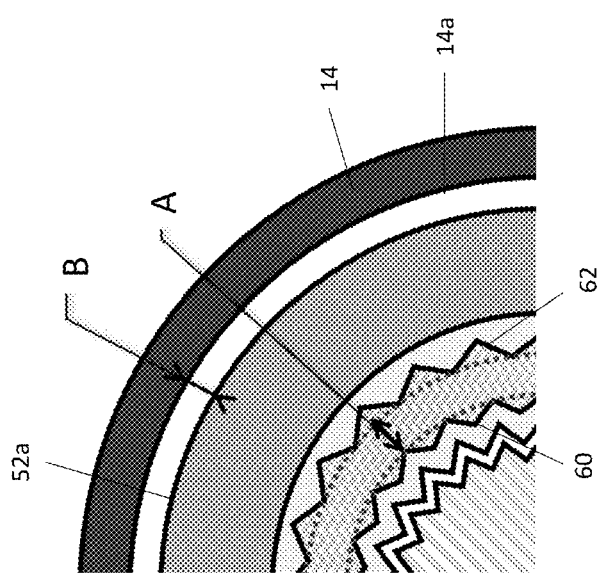
FIG. 5A shows another plan view of the brake and brake disk of FIG. 3.

The fusible material section 58 may take a variety of shapes. In the examples shown in FIGS. 3, 5A and 5B, the fusible material section 58 is substantially ring-shaped and has a zig-zag profile at a radially inner side 60 of the ring-shape (i.e. towards the teeth 54 and mounting portion 55) and has a zig-zag profile at a radially outer side 62 of the ring shape (i.e. towards the braking surface 56). The zig-zag profiles assist the transmission of torque between the shaft 12 to the braking surface 58, i.e. by preventing slip between the various components of the braking disk 52. Other shapes for the profile at the outer side 62 and at the inner side 60 are envisaged, including splines, teeth, or a wavy shape. In general, any non-circular shape for the profile at the outer side 62 and/or inner side 60 may suffice to assist torque transmission between parts of the brake disk 52, i.e. to assist torque transmission between the shaft 12 and the braking surface 56. Specific shapes may be chosen on the basis of ease of manufacturing and/or effectiveness of torque-transfer.

The fusible material section 58 has a minimum radial thickness A.

A gap B is defined as the radial clearance between the outermost radial side 52a of the brake disk 52 and an inner wall 14a of the housing 14, when the brake disk 52 is intact (i.e. when the fusible material section 58 is intact and connects the teeth 54 to the braking surface 56).

Thickness A is greater than gap B, i.e. A>B. That is, the gap B between the radially outermost extent 52a of the brake disk 52 and the inner wall 14a of the housing 14 is smaller than the minimum radial thickness A of the fusible material.

In the event that the fusible material section 58 melts/thermally decomposes, and the brake pads 18,20 are subsequently released, the braking surface 56 (and the outer portion 55b of the mounting portion that is connected to the braking surface 56) will be free to move under gravity or vibration within the housing 14. If the braking surface 26 moves transverse to the shaft axis X, it will not come into contact with the teeth 54 or the shaft 12 because A>B. That is, the radially outermost surface 52a of the braking disk 52 will come into abutment with the inner surface 14a of the housing 14 before a radially inward part can contact either the shaft 12 or the mounting portion 55a. Thus, the disconnected part of the brake disk 52 will not be "bounced around" within the housing 14 by coming into contact with the still-spinning shaft 12.

In the example shown in FIG. 4b, A is sufficiently greater than B such that the disconnected portion of the brake disk 52 may additionally be tilted relative to the shaft axis X and still not come into contact with the shaft 12.

In another example, where the baking surface 56 is thin it is possible that tilting movement of the disconnected portion of the brake disk 52 relative to the shaft axis X could cause contact with parts still in rotation (e.g. the shaft 12 or the mounting portion 55a). To avoid this contact, the backlash between pads 18 and 20 in the brake-released position can be reduced. In this situation, contact between the (tilted) braking surface 56 and one or other of the brake pads 18,20 may limit the tilting movement of the disconnected braking surface 56. Alternatively or additionally, the minimum radial thickness A of the fusible material section 58 may be enlarged to compensate for possible tilting of the braking surface after the fusible material section 58 no longer connects between the braking surface 58 and the shaft 12

Figure 6:
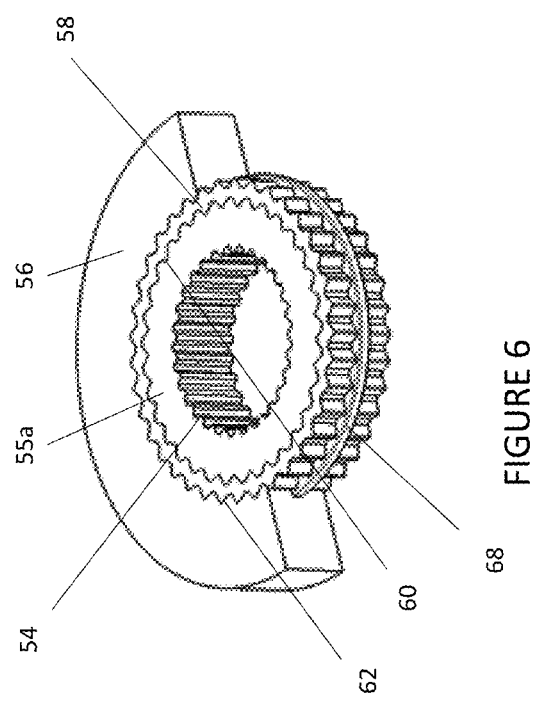
FIG. 6 shows a perspective cut-away view of the brake disk of FIG. 3.

FIG. 6 shows a perspective view of the brake disk 52 with a portion of the braking surface 58 removed in order to show further features of the fusible material section 58. This example brake disk 52 does not have an outer mounting portion 55b, and instead the fusible material section 58 directly contacts the braking surface 56.

In this example, the fusible material section 58 has a spline 68 extending circumferentially around its outer side 62 at an axial location within the axial thickness of the brake disk 52. The spline 68 engages with a corresponding circumferential groove 66 on a radially inner side of the braking surface 56. This spline 68 may assist in transmitting axially directed forces (e.g. forces axially along the direction of the shaft axis X) within the brake disk 52. This mechanical engagement may therefore assist in holding together the brake disk 52 during normal operation.

Figure 7A:
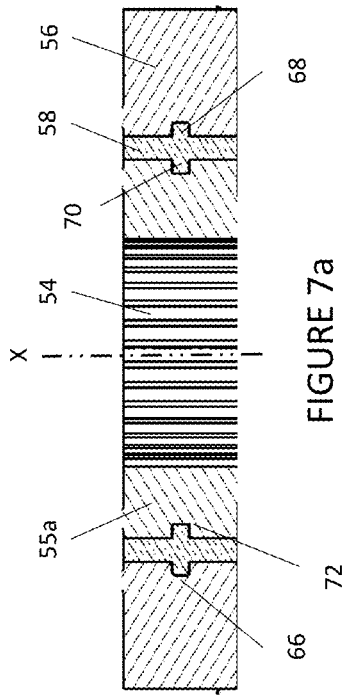
FIG. 7A shows a cross-section of a brake disk according to the present disclosure.

FIG. 7A shows a cross-section through the brake disk 52 shown in FIG. 6. The fusible material section 58 has a second spline 70 extending circumferentially around its inner side 60 at an axial location within the axial thickness of the brake disk 52. The second spline 70 engages with a corresponding circumferential groove 72 on a radially outer side of the mounting portion 55a. This mechanical engagement may therefore assist in holding together the brake disk 52 during normal use.

Figure 7B:
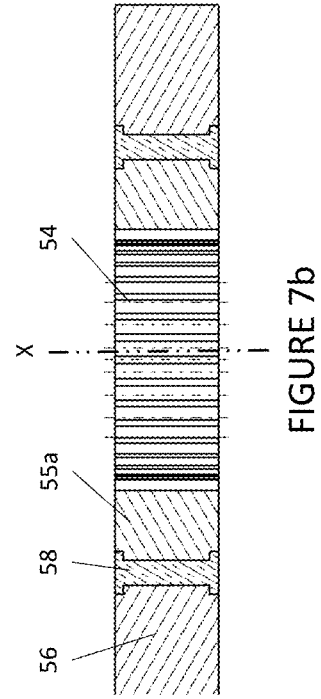
FIG. 7B shows an alternative cross-section of a brake disk according to the present disclosure.

FIG. 7B shows an alternative design of fusible material section 58 in which the fusible material has an I-shaped cross-section when viewed in the plane of the brake disk 52. The braking portion 56 and the mounting portion 55a both extend in-between the top and bottom radially extending portions of the I-shaped cross-section, such that the fusible material section 58 is held securely within the brake disk 52. Stated another way, a pair of open grooves may be machined on axially front and rear surfaces of the braking surface 56 and of the mounting portion 55a, and the fusible material may fill these open grooves to provide axial strength to the brake disk 52.

The material for the fusible material section 58 is chosen to have a lower melting temperature (or thermal decomposition temperature etc.) than the braking surface 56 and the mounting portion 55a,b.

A method 100 of making a braking disk (52) is shown in FIG. 8. The method includes, at step 102, arranging two components such that an annular gap is defined therebetween.

At step 104, molten fusible material is poured into the annular gap to fill the gap.

At step 106, the molten material is cooled so that it solidifies to form the fusible material section 58.

That is, the fusible material section 58 is cast between the two components.

Therefore, in one example, the two components may be two portions 55a and 55b of the mounting portion may be placed concentrically with one another with the annular gap defined therebetween.

In another example, the annular gap is defined between the braking surface 58 and the (single-part) mounting portion 55a,b.

In another example that lacks a mounting portion 55a,b (i.e. where the teeth 54 are formed in the fusible material section), a sacrificial component is provided radially inward of the braking surface 58, e.g. to mimic the outer surface of the shaft 12, and the annular gap is formed between the braking surface and sacrificial component. The molten fusible material may be poured into the gap and, after the material has solidified, the sacrificial portion may be removed.

In another example, the brake disk 52 may be formed to be integral with the shaft 12. In this example, a first of the two components is the braking surface 56 and a second of the two components is the shaft 12.

In all of the above examples, one or both of the components may have a toothed or zig-zag profile such that a toothed or zig-zag profile is formed in the resultant fusible material section.

The brake disk 52 of the present disclosure may also be used in other brake designs.

Figure 9:
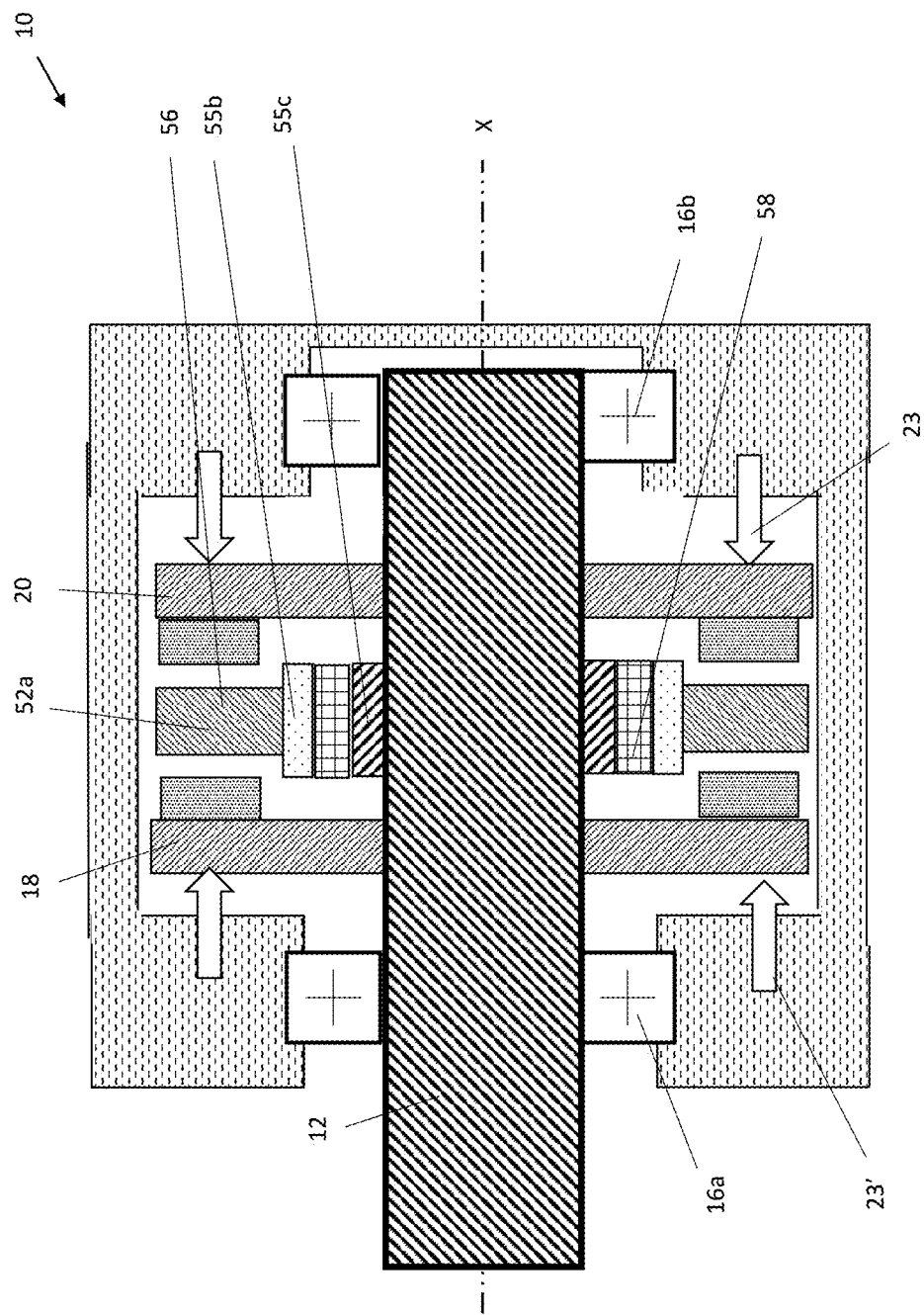
FIG. 9 shows brake having two movable brake pads.

FIG. 9 shows an example brake 10a in which both brake pads 18,20 are movable. A first means 23' (e.g. an actuator) is provided for moving the first brake pad 18 axially within the brake 10a, and, a second means 23 is provided for moving the second brake pad 20 within the brake 10a. The brake pads 18,20 are thus both movable and may be moved so as to squeeze the braking surface 56 therebetween to effect braking. The brake disk 52a is either axially fixed with respect to the shaft 12 or formed integrally with the shaft 12. In the example shown in FIG. 9, there is a mounting portion 55c that is axially fixed relative to the shaft 12. The fusible material section 58 sits radially outward of the axially fixed mounting portion, and a second portion 55b of the mounting portion sits radially outward of the fusible material section 58. The braking surface is connected to a radially outer side of the second portion 55b. In general, the brake disk 52a of FIG. 9 may have a braking surface 56 and fusible material section 58 that are identical to the braking surface 56 and fusible material section 58 of the braking disk depicted in e.g. FIG. 3 or 4A. The other features of the brake 10a of FIG. 9 may otherwise be identical to the brake 10 described hereinabove, e.g. in relation to FIG. 4.

Further, is known to provide a multi-disk brake, where multiple brake disks are disposed on a shaft (e.g. shaft 12) and axially movable along the shaft. Between and around the multiple brake disks there are multiple brake pads. To actuate the brake, at least an endmost brake pad is driven axially to compress the multiple brake disks between the brake pads. Any or all of the brake disks in this design may be a brake disk 52 according to the present disclosure.

The terms "about" and "substantially" are intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The term "a plurality" is understood to include any integer number greater than or equal to two, i.e., two, three, four, five, etc. The term "connection" can include an indirect "connection" and a direct "connection".

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently (or simultaneously), or the blocks may sometimes be executed in the reverse order, depending upon the functionality involved. It is also noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description but is only limited by the scope of the appended claims.

The invention claimed is:

1. A brake disk, the brake disk defining an annular shape having a radially inner side and a radially outer side; the brake disk comprising:
a radially outer braking surface, the braking surface having a maximum operating temperature;
a fusible material section radially inward from and connected to the braking surface, the fusible material having a maximum operating temperature, the fusible material section for transmitting torque between the braking surface and a shaft while a temperature of the fusible material section is below the maximum operating temperature of the fusible material section;
wherein the maximum operating temperature of the braking surface is higher than the maximum operating temperature of the fusible material section; and
wherein when the temperature of the fusible material section raises above the maximum operating temperature of the fusible material section, the fusible material section is configured to no longer transmit torque between the braking surface and the shaft; and
wherein the fusible material section comprises a spline extending circumferentially around a radially outer side of the fusible material section; and/or wherein the fusible material section comprises a spline extending circumferentially around a radially inner side of the fusible material section.

2. The brake disk of claim 1, further comprising an annular mounting portion, wherein one or more teeth are formed in a radially innermost surface of the mounting portion.

3. The brake disk of claim 2, wherein the annular mounting portion comprises a first portion and a second portion, wherein the fusible material section is formed between the first and second portions of the mounting portion, such that the fusible material section is connected to the braking surface via the second portion of the mounting portion.

4. The brake disk of claim 2, wherein the mounting portion has a first axial thickness, wherein the fusible material has a second axial thickness, and wherein the braking surface has a third axial thickness, wherein the third axial thickness is less than the first and second axial thicknesses.

5. A brake for an aircraft comprising:
a housing;
a shaft defining an axis (X) and extending into the housing and having teeth or splines;
a first brake pad and a second brake pad; and
the brake disk of claim 1 arranged on or formed integrally with the shaft and located axially between the first and second brake pads;
wherein the brake is configured to move at least one of the brake pads to press against the braking surface of the brake disk to resist rotation of the brake disk via friction and thereby resist rotation of the shaft.

6. The brake of claim 5, wherein the fusible material section has a minimum thickness (A) in the radial direction, and wherein a gap having a length (B) is defined between a radially outermost surface of the braking disk and an inner surface of the housing, wherein the minimum thickness (A) is larger than the gap length (B).

7. The brake of claim 5, further comprising one or more bearings mounted to the shaft and to the housing for supporting the shaft for rotation within the housing, and/or further comprising an actuator for moving one of the first or second brake pads axially within the housing along the direction of the shaft axis (X).

8. The brake disk of claim 1, wherein the fusible material section has a non-circular profile at a radially outer surface; or wherein the fusible material section has a non-circular profile at a radially inner surface.

9. The brake disk of claim 8, wherein each non-circular profile comprises one of: a toothed outer-profile, a splined outer profile, and a zig-zag outer profile.

10. The brake disk of claim 1, wherein the fusible material section is made from a eutectic material.

11. The brake disk of claim 1, wherein one or more teeth are formed at a radially innermost surface of the fusible material section.

12. The brake disk of claim 1, wherein the maximum operating temperature of the fusible material section is within the range of 200° C. to 1000° C.; or wherein the fusible material section is configured to melt, to thermally decompose, or to substantially weaken when above its maximum operating temperature, so as to no longer transmit torque to the braking surface.

13. A method of making a brake disk, the method comprising:
  pouring a molten fusible material into an annular gap between two components, wherein the two components are either:
  1) First and second mounting portions of the brake disk; or
  2) a mounting portion and a braking surface of the brake disk; or
  3) a braking surface of the brake disk and a sacrificial component; or
  9) A braking surface of the disk brake and a shaft;
  the method further comprising:
  solidifying the fusible material to form a fusible material section between the first and second components;
  wherein the fusible material section comprises a spline extending circumferentially around a radially outer side of the fusible material section; and/or wherein the fusible material section comprises a spline extending circumferentially around a radially inner side of the fusible material section.

14. The method of claim 13, further comprising machining an annular groove into one or both of the components, such that when the molten fusible material is poured into the annular gap, the molten fusible material fills the groove(s).

* * * * *